Nov. 25, 1969 J. E. MARIAN 3,480,054
METHOD OF FORMING FINGER JOINTS
Original Filed Aug. 22, 1966 2 Sheets-Sheet 1
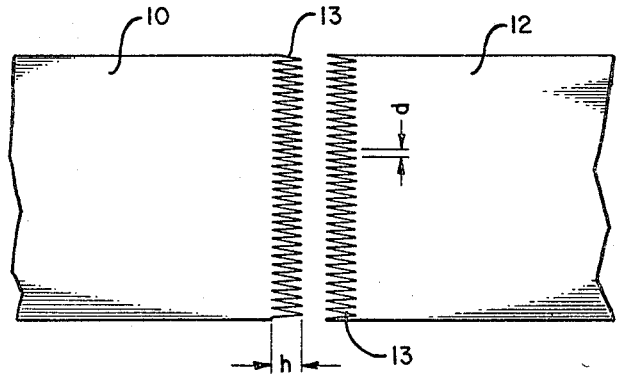
FIG-1
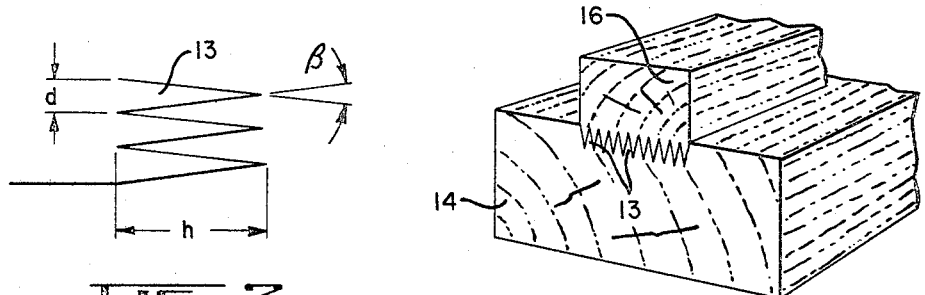
FIG-2
FIG-3
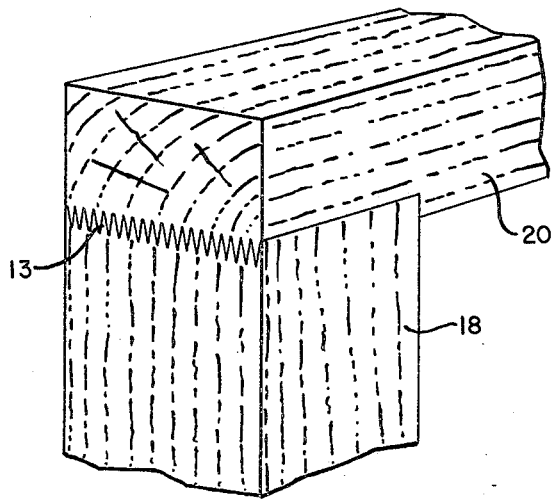
FIG-4
INVENTOR.
JOSEF ERIC MARIAN
BY Lippincott, Gregg,
Henderson & Stidham
ATTORNEYS United States Patent Office 3,480,054
Patented Nov. 25, 1969

3,480,054
METHOD OF FORMING FINGER JOINTS
Josef E. Marian, Berkeley, Calif., assignor to Hombak Maschinenfabrik KG., Bad Kreuznach, Germany, a German company
Original application Aug. 22, 1966, Ser. No. 574,055. Divided and this application Dec. 9, 1968, Ser. No. 782,180
Claims priority, application Sweden, June 29, 1966, 8,898/66
Int. Cl. B27f 1/00
U.S. Cl. 144—317                                 6 Claims

ABSTRACT OF THE DISCLOSURE

A method of forming a finger joint by precisely machining narrow (preferably three or more per centimeter) and short (preferably less than fifteen millimeters long) fingers on the mating surfaces, applying an adhesive and forcing the joint together under pressure, a satisfactory bond being achieved in a brief period of time.

---

This application is a division of my copending application Ser. No. 574,055 filed Aug. 22, 1966 for "Finger Joint for Uniting Two Pieces of Cellulosic Material" for which application priority was claimed under the International Convention based on an application Ser. No. 8,898/1966 filed by me in Sweden on June 29, 1966.

This invention relates to a method of forming finger joints, and more particularly to a method of forming a finger joint between pieces of material comprising cellulose, such as wood, fibre board or particle board, veneer, etc.

Methods of joining pieces of wood by means of finger joints have long been known, but the customary methods entail the joining of a relatively small number of long, wedge-shaped inter-locking fingers, the lengths of which generally exceed 15 mm., and may be as long as 60 mm., with the pitch in finger spacing varying between 15 and 7 mm. In addition, a so-called fingertip clearance was prescribed in order to assure that full pressure is reached at the outermost finger flanges. On the machined fingers of the material to be joined together adhesive is spread, then the pieces are put together and pressure is applied in longitudinal and frequently even in perpendicular direction. Pressure acting perpendicularly has been and is generally considered necessary until the adhesive has hardened, in order to insure a full good glue joint at the outermost fingers.

What hitherto has been considered as conditions for more or less strong finger joints is illustrated in the following table. The fingers given are based on German Standard DIN 68 140 (German Industrial Standard):

|  | Finger Length (h), mm. | Number of Fingers/ cm. (z) |
|---|---|---|
| Strength Group: | | |
| I | 60 | 0.68 |
|  | 50 | 0.83 |
|  | 40 | 1.10 |
| II | 35 | 0.83 |
|  | 30 | 0.90 |
|  | 25 | 1.00 |
| III | 20 | 1.30 |
|  | 15 | 1.40 |

The trend which up to now has dominated research and development is evident: highest strength can be achieved with a relatively small number of long fingers. A decreasing finger length is expected to give lower strength.

Finger jointing as presently practiced is in many respects technically unsatisfactory. Even when the highest admissible axial or longitudinal pressure is applied, 40–50 kp./cm.$^2$ (kilopounds pressure per square centimeter, or about 600 to 800 p.s.i. without splitting the woody members through the wedging action of the fingers, no reliable bonding is achieved until the adhesive has been cured at least to some extent.

If pressure is applied only for a short period of time the fingers will "spring back," that is slide from a close contact, and the outermost fingers will not be bonded properly.

For this reason it is risky to manipulate the joints for further processing before the lapse of several hours. Reliable results are only obtained with long pressing time or through the application of high-frequency heating or some other more or less complicated methods.

Finally it can be pointed out that lumber waste is proportional to the length of finger joints. As a rule, pieces of material less than three feet in length are jointed together. Wood waste may run up to 3–4% and even much more for structural timber (lumber).

During the 1960's attempts have been made in the United States to develop a material saving method with short fingers. By this method, which became known as "printed finger joints," the elimination of the cutter-head operation has been advocated as suitable for the production of the small finger profile (see for example M. D. Strickler "Impression Finger Jointing of Lumber" dated Aug. 28, 1962 and his U.S. Patent No. 3,262,723 dated July 26, 1966). Profiling is produced by preslotting, sawing and impressing a heated tool, the so-called "impressor." The surfaces to be joined are considerably modified through this treatment (Strickler describes them as being "plasticized") so that they become refractory to the adhesive and produce poor joints, for which reason this complicated and, as far as tooling is concerned, expensive method has apparently not reached the practical, commercially useful stage.

The present invention is based on a surprising observation which contradicts hitherto accepted views. When joining carefully machined profiles with smaller fingers than used conventionally up to now, in other words with a sufficient number of machined fingers per unit of length (high z-number) and short finger length, new and surprising results appear, inasmuch as such a joint, even though the components are pressed together for a very short period of time, exhibits such strength that it is aligned indestructibly and, therefore, can be processed further without delay. Moreover, after the adhesive is completely cured the strength of solid lumber is actually achieved when sufficient longitudinal pressure is applied and tip clearance is reduced to a minimum.

Adhesively bonded joints with the strength of solid wood are unknown today. Because of instant interlocking, the new method according to this invention permits the use of any room temperature curing adhesive and eliminates all gluing difficulties and, in many cases, also replaces high frequency gluing. The immediate insensitivity of the bond to rough handling is of great practical significance.

The attached drawings illustrate some embodiments of the invention in the form of finger joints made according to this invention.

FIGURE 1 is a plan view of finger joint components prepared according to one embodiment of the invention;

FIGURE 2 is a partial view showing some fingers on a larger scale;

FIGURES 3 and 4 are perspective views of two further embodiments of the invention.

Figure 5:
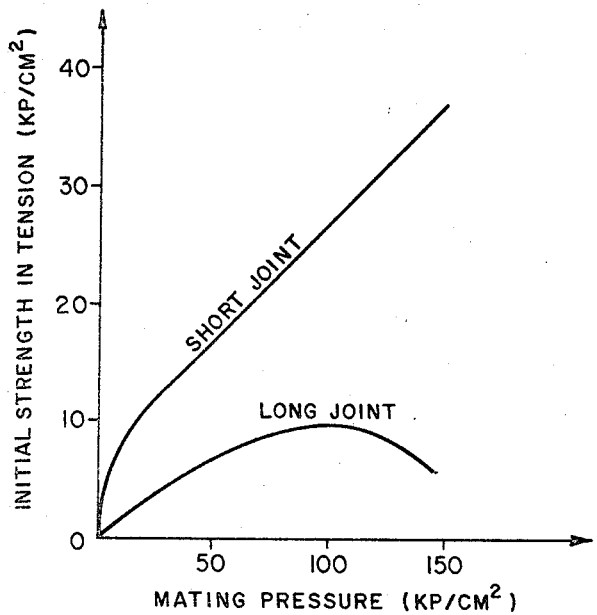
FIGURES 5 and 6 are comparative graphs illustrating the relative strength of the long and short finger joints.

Referring now to FIGURES 1 and 2, reference numerals 10 and 12 designate two members or elements of wood which are to be jointed by means of finger joints 13, consisting of fingers formed at the end wood surfaces facing one or another of said members or elements.

The fingers are accurately machined to their ultimate shape and dimensions through a one or two stage cutting process so that a really tight fit is obtained without any, or at least without any appreciable fingertip clearance.

As an example, it may be mentioned that two wooden members may have a cross-sectional area of 45 cm.$^2$ (10 x 4.5 cm.). The wedge-shaped fingers extend perpendicularly to, and are aligned along the width of the cross section, that is perpendicularly toward the plane of the paper in the drawing. If it is further assumed that pitch per centimeter $z$/cm.=5, then the finger spacing $d$ is $$d = \tfrac{1}{5} \text{ cm.} = \tfrac{10}{5} \text{ mm.} = 2 \text{ mm.}$$

Finger length ($h$) is assumed to be 8 mm. The slope of the finger may then be determined from the tangent of one-half the tip angle;

$$\tan \frac{B}{2} = \frac{\tfrac{1}{2} \times d}{h} = \frac{1}{8} = .125$$

Hence, the slope, $B/2 = 7°$ approximately and $B = 14°$. The profile is coated with resorcinol resin glue, a room-temperature curing adhesive. The members are pressed together with 150 kp./cm.$^2$, or about 2300 p.s.i. for a period of 2 to 3 seconds. Immediately after pressing together the joint is insensitive to imposed external stresses, for example, hard impacts or blows.

Tests have shown that an axial tension force of 20 kp./cm.$^2$ (280 p.s.i.) is required to separate a joint which has been treated with water alone, i.e., without use of an adhesive.

Where an adhesive is used and is set the joint exhibits a strength both in tension and bending virtually equal to that of solid wood Without any sidewise pressure the outermost fingers are perfectly bonded. The high strength is achieved without any tip clearance which, up to now, has been considered indispensable. Through this, it was thought that "grounded" finger tips could be avoided at compression. As a matter of fact, the strength of the joint is actually reduced by the provision of the usual clearance of ½ to 1 mm. The discontinuities in the joint caused by the tip clearances produce stress concentrations which, at loading, lead to an early fracture or rupture.

This phenomenon, surprising even for experts, depends to a high degree on the accuracy of the machined profiles with a high $z$-number, and is very likely a consequence of the fact that fingers with small base lines are more pliable than large unyielding fingers and interlock, or intertwine, more readily when they are pressed together. Swelling may or may not play a part in this process. The finger surfaces to be bonded are so intimately contacted that various surface processes can take place. In this connection, properties of the surfaces produced through cutter head operations play an important role. The free end of the cellulose molecular chains seem to have the capacity to intertwine: the effect is similar to the "autohesion" of uncured rubber, which melt together through interpenetration of the ends of the chain molecules.

Treatment of the woody surfaces with hot metal tools to form the profile, as applied in the aforementioned Impression Finger Jointing Method leads to "glazing" and a sort of a lacquering of the wood surfaces through migration of the melting resin and lignin. Such a process renders a pronounced "refractory" surface for subsequent bonding, in clear distinction to the present invention.

In this connection, it should even be mentioned that a larger number of small fingers ($z$)/cm. permits the application of higher longitudinal bonding pressure, which results in a better surface contact. The total pressure is distributed on a larger number of finger tips so that the risk of splitting, or cleavage is diminished. The same high axial pressure applied in the example referred to above would split the wood if conventional fingers were employed.

Figure 6:
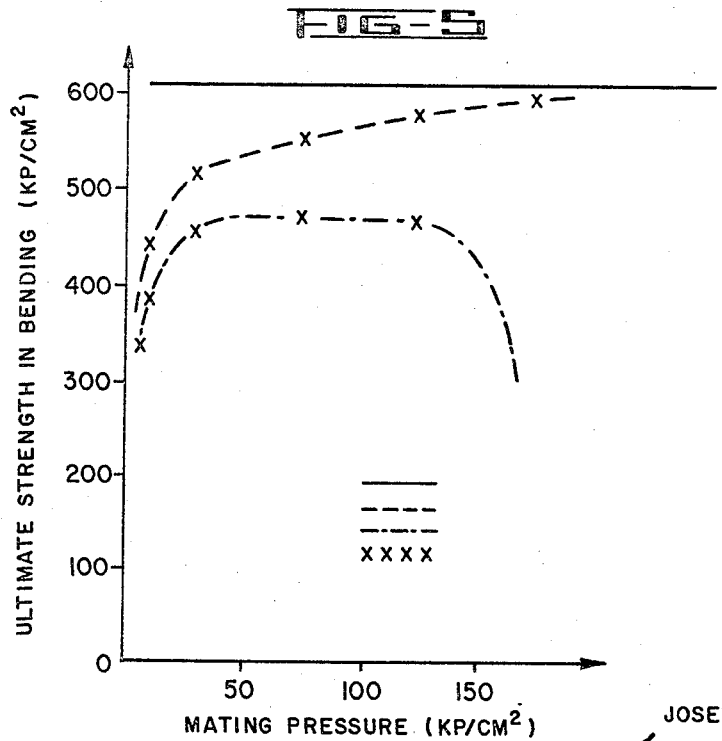

It is to be emphasized that the strength of the joint does not depend upon the relative dimensions of the fingers but upon the formation of a large number of short fingers. This is illustrated in FIGURES 5 and 6, wherein strength tests were run on both long and short finger joints having quite similar profiles, the principal difference being in the length of the fingers. The joints are compared in strength in FIGURES 5 and 6 as "short joint" and "long joint" having, respectively, the following characteristics:

| | Short joint: | Long joint: |
|---|---|---|
| Slope (tan $B/2$) | 1:8.4 | 1:8.4 |
| Pitch ($d$) | 2.5 mm. | 10.25 mm. |
| Finger length | 8.0 mm. | 34.0 mm. |

In FIGURE 5, the graph illustrates the comparative initial strengths of the joint immediately after mating and pressing them together, e.g., after 3 to 5 seconds. While it may have been anticipated that the strengths would be approximately equal, this was shown to be not the case at all. At low mating pressure there was a distinct and rapid improvement in the strength of the short joint, and this initial strength continued to increase at a rapid rate as mating pressure was increased. On the other hand, the strength of the long joint increased at a much lower rate and then fell off rapidly at about 100 kp./cm.$^2$ (1550 p.s.i.) when the long joint splintered.

Similarly, as shown in FIGURE 6, the ultimate strength of the short joint is also superior. Tests show that the rates of strength increase as roughly similar at low mating pressures, though the strength of the short joint was greater at each level tested. Thereafter, the strength of the long joint leveled off over a wide range of mating pressure and then fell off rapidly at about 125 kp./cm.$^2$ (1950 p.s.i.). In clear distinction, the strength of the short joint continued to increase with mating pressure until the strength of a solid piece of lumber, indicated by the solid, horizontal line, is approached.

The smaller length of the fingers, according to this invention, also contributes to the favorable result. On compression of the profiles to which adhesive has been applied a certain amount of glue is squeezed against the finger bases. A large surplus cannot be squeezed out in a short period of compression. When pressure is released the joint can open up again and some adhesive flow out, thereby reducing contact pressure between the finger surfaces. It is obvious that an accumulation or surplus adhesive at the finger bases will be diminished through reduced finger lengths.

In some cases instant bonding of the finger joints and the simplified practice they permit will be more important than the achievement of extremely high strength values, e.g., when unstressed items, such as door and window frames, are produced. In such cases, it will be advantageous to use cutter-head tools as sturdy and wear-resistant as possible.

As examples of these applications, there may be cited finger jointing of framing stock. The fingers may have the following configuration $z=2$, $h=14$ mm. (pointed finger tips), or $h=11$ mm. (1 mm. tip surface dimension instead of a pointed tip); $B=21°$. Tip clearance may be admissible though not necessary. Longitudinal pressure may be reduced to 30–40 kp./cm.$^2$ (465–620 p.s.i.). If these structures are to be used in interior (protected) locations, adhesives nonresistant to water such as urea or polyvinylacetate glues may be used.

Finger jointing has been applied up to now predominantly to bond two pieces of wood endwise, the joint running across the fibre direction. This invention, however, can be advantageously used for edgewise gluing, i.e., formation of a joint running parallel to the fibre direction. An example of this mode of application is illustrated in FIGURE 3, where a relatively thick list 14 is joined to a smaller list 16. This latter element 16 may, for example, form a catch in a door frame. Up to now, such a bonding operation required either high-frequency heating of the glue line or long pressing time, because convective heat only gradually penetrates to the glue line through the relatively thick section of wood. In accordance with this invention the surfaces to be joined are profiled with a series of corresponding fingers 13 through one or more machining steps to the ultimate configuration. Through a very brief compression with glue on the mating surfaces the lists are aligned and fixed as intended.

Wood waste which is proportional to the length of the fingers must be computed in this case as based on the thickness of the wooden members, and will, therefore, be larger than in the case of end-wood gluing. It is, therefore, most suitable to use very small fingers with $h=3-5$ mm. and $z=5-8$. In such a case, wood waste is of the same order of magnitude as in the case of using a conventional mortise and tenon-type joint.

It is obvious that edge-wise gluing can also be used to build up multiple layer elements, that is material composed of several elements.

FIGURE 4 illustrates a corner section of a door frame, for example, in which a finger joint 13 is provided between the end face of a frame piece 18 and the side portion of an adjacent frame piece 20 in which the direction of the finger ridges of the joint is parallel to the fibre direction of 20. The fingers extend over the entire or almost entire end surface of portion 18 and such an extent of the side piece 20 as corresponds to the end surface of 18. Frame constructions such as door or window frames can be assembled in a few seconds in this way to form sturdy and stable articles. Assembling by means of these miniature finger joints, according to this invention, is mechanically, by far, superior to conventional methods of assembling by mortise and tenon, nailing, etc.

The lower limit for the number of fingers/cm., $z$/cm., counted perpendicularly to the precisely machined ultimate wedge-shaped plane, according to this invention to this invention, is assumed to be 1.6. The upper limit is determined by the cutter-head tool used and $z$/cm.$=16$. Particularly suitable values have been found to be between $z$/cm.$=2-3$ and 8-10/cm. The finger length ($h$) should be below 20 mm. and should preferably be less than 15 mm. This means that the finger tip angle B, preferably, should be between 8° and 30° and most advantageously between 12° and 25°. Longitudinal pressure to compress both members of the joint should lie within the limits of 50 kp./cm.$^2$ (775 p.s.i.) and 200 kp./cm.$^2$ (3100 p.s.i.), particularly when no tip clearance is contemplated.

The surface of the fingers need not be plane but may have curved shape

While several more or less specific embodiments of the invention have been shown and described, it is to be understood that this is for purposes of illustration only, and that the invention is not to be limited thereby but it scope is to be determined by the appended claims.

I claim:
1. A method of uniting two members of cellulosic material in a finger joint comprising the steps of:
   selecting complementary surfaces of said members between which the joint is to be formed,
   machine cutting without application of heat at least two wedge-shaped fingers per centimeter and no more than 15 millimeters in length in each of said complementary surfaces,
   said fingers being precisely configurated and conditioned to interfit closely throughout their surfaces,
   applying an adhesive to the contacting surfaces of said fingers, and
   forming said complementary surfaces together under a pressure of at least twenty kilopounds per square centimeter.
2. The method defined by claim 1 wherein said pressure is released after a period of approximately three seconds.
3. The method defined by claim 1 wherein at least three of said fingers are machine cut per centimeter.
4. The method defined by claim 1 wherein said fingers are cut in wood members having fibers extending in approximately parallel relationship so that the ridges of said fingers are transverse to the fiber direction in both members.
5. The method defined in claim 1 wherein said fingers are cut in wood members having fibers extending in approximately parallel relationship and the ridges of said fingers are cut parallel to the fibers of said members.
6. The method defined in claim 1 further defined by said members being pressed together at a pressure in the range of fifty to two hundred kilopounds per square centimeter.

References Cited

UNITED STATES PATENTS

| 1,796,185 | 3/1931 | Beerworth | 144—309 |
| 2,870,807 | 1/1959 | Payzant | 144—218 |
| 3,262,723 | 7/1966 | Strickler | 287—20.92 |

OTHER REFERENCES

Russian Publication: Derevopererabalyvaiushchaia I Lesokhimicheskaia Promyshiennost, Pavlov, vol. 3(10), pp. 5–8, 1954.

Forest Products Journal: Selbo, September 1963, pp. 390–400.

GERALD A. DOST, Primary Examiner

U.S. Cl. X.R.

287—20.29